United States Patent [19]

Young et al.

[11] Patent Number: 4,528,720
[45] Date of Patent: Jul. 16, 1985

[54] METHOD OF AND APPARATUS FOR PROCESSING SQUID

[76] Inventors: James A. Young, 4200 Opal Cliff Dr., Santa Cruz, Calif. 95062; David W. Hartzell, 122 Crestview Ter., Santa Cruz, Calif. 95060

[21] Appl. No.: 461,615

[22] Filed: Jan. 27, 1983

[51] Int. Cl.³ ............................................. A22C 29/00
[52] U.S. Cl. ............................................ 17/50; 17/51; 17/53; 17/71
[58] Field of Search .................... 17/53, 71, 63, 51, 50; 83/95, 98, 99, 402, 409.1, 409.2, 411 R, 423; 198/456, 394; 53/581

[56] References Cited

U.S. PATENT DOCUMENTS

| | | |
|---|---|---|
| 1,724,587 | 8/1929 | Anker-Holth . |
| 1,828,725 | 10/1931 | Muller et al. . |
| 1,853,328 | 4/1932 | Youmann . |
| 1,900,267 | 3/1933 | Youmann . |
| 2,493,291 | 1/1950 | Hirsch . |
| 2,543,931 | 3/1951 | Peterson ............................. 53/581 X |
| 2,799,043 | 7/1957 | Walker ................................... 17/63 |
| 2,835,918 | 5/1958 | Schlichting . |
| 2,951,490 | 9/1960 | Cuillier . |
| 3,001,349 | 9/1961 | Hoag ..................................... 53/581 |
| 3,067,644 | 12/1962 | Dearsley ........................... 83/411 R |
| 3,409,115 | 11/1968 | Porcaro ........................... 198/456 X |
| 3,461,485 | 8/1969 | Crepeau ................................ 17/63 |
| 3,488,799 | 1/1970 | Danielsson ......................... 17/63 X |
| 3,670,363 | 6/1972 | Hogan et al. . |
| 3,947,921 | 4/1976 | Berk . |
| 4,285,099 | 8/1981 | Singh et al. . |
| 4,329,761 | 5/1982 | Olsson . |

FOREIGN PATENT DOCUMENTS

| | | |
|---|---|---|
| 3111567 | 10/1982 | Fed. Rep. of Germany . |
| 422969 | 7/1972 | U.S.S.R. . |
| 584834 | 12/1977 | U.S.S.R. . |
| 596205 | 3/1979 | U.S.S.R. ............................... 17/53 |

Primary Examiner—Willie G. Abercrombie
Attorney, Agent, or Firm—Jack M. Wiseman

[57] ABSTRACT

A squid processing method and apparatus includes means for sectionizing squid while they are on a feed conveyor, and then transferring selected sections to a processing conveyor on which each section is skinned and its internal organs separated from the edible portion of the section and flushed away.

6 Claims, 7 Drawing Figures

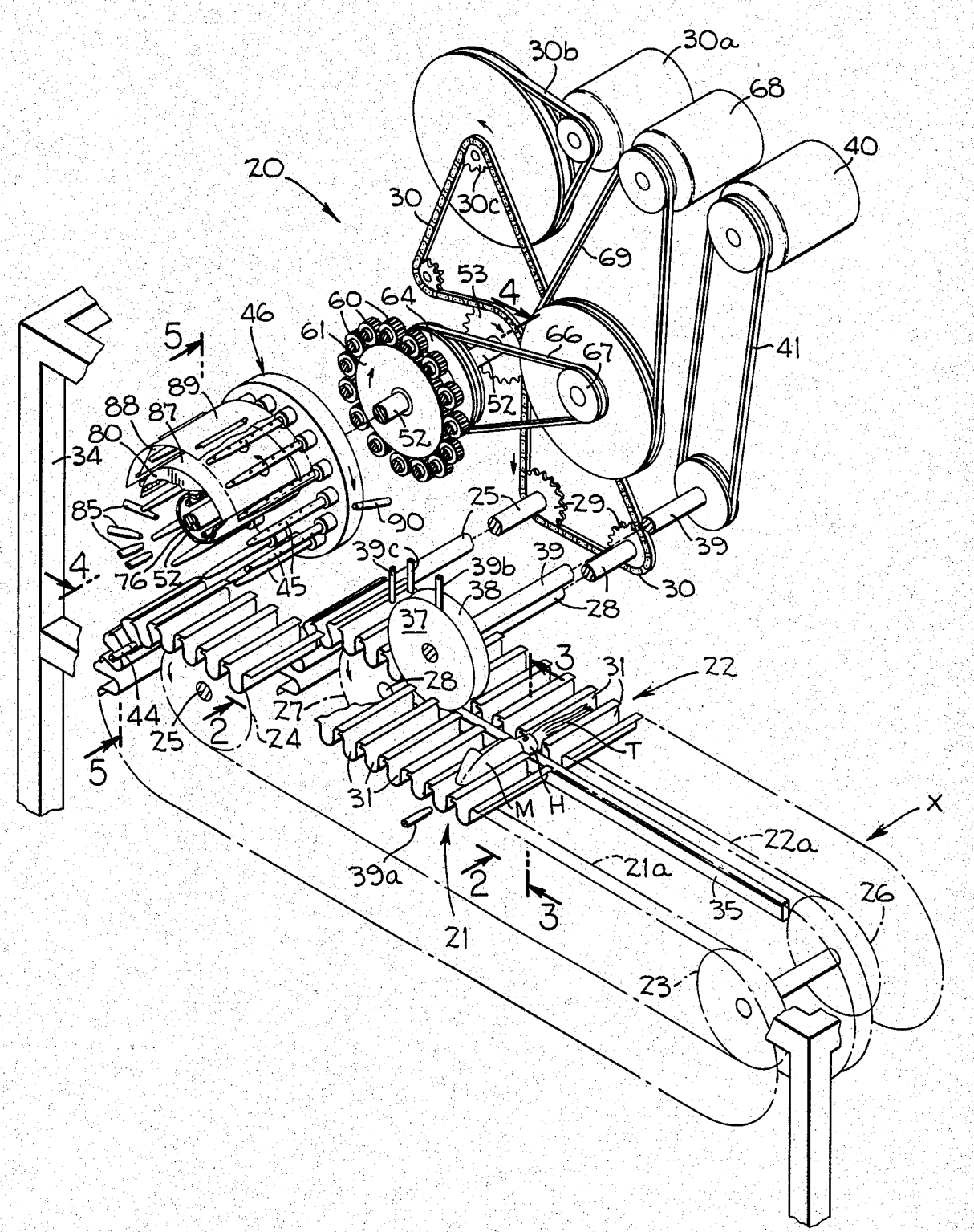
Fig_1

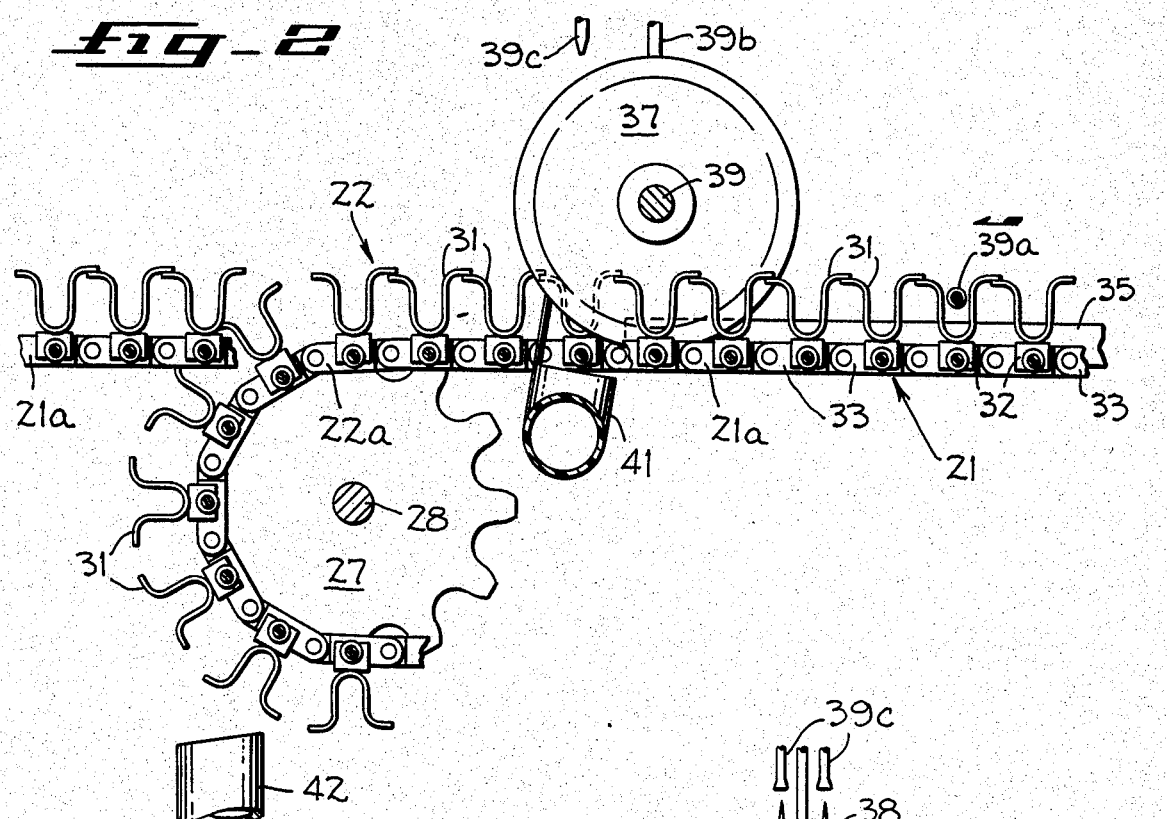
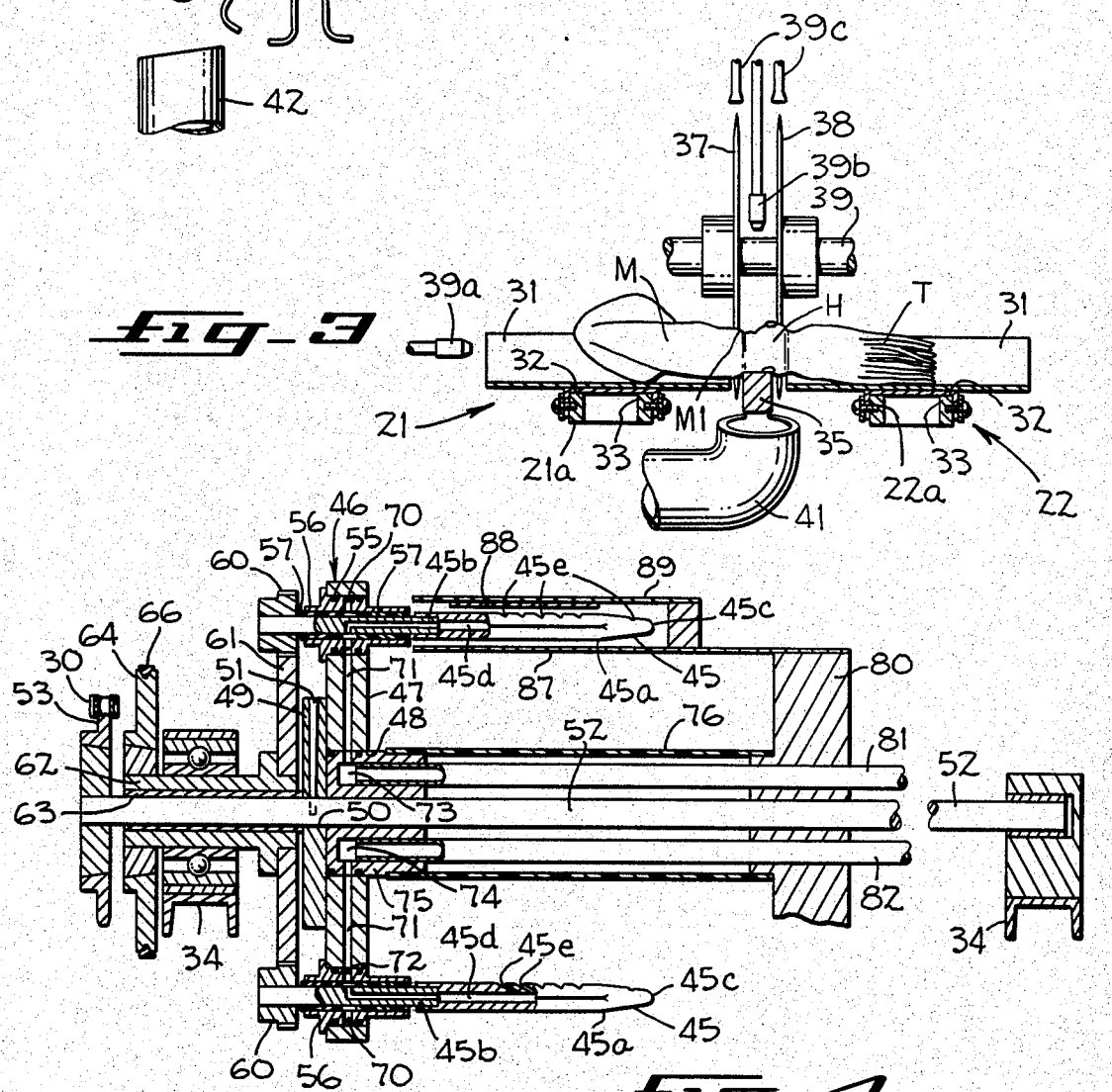

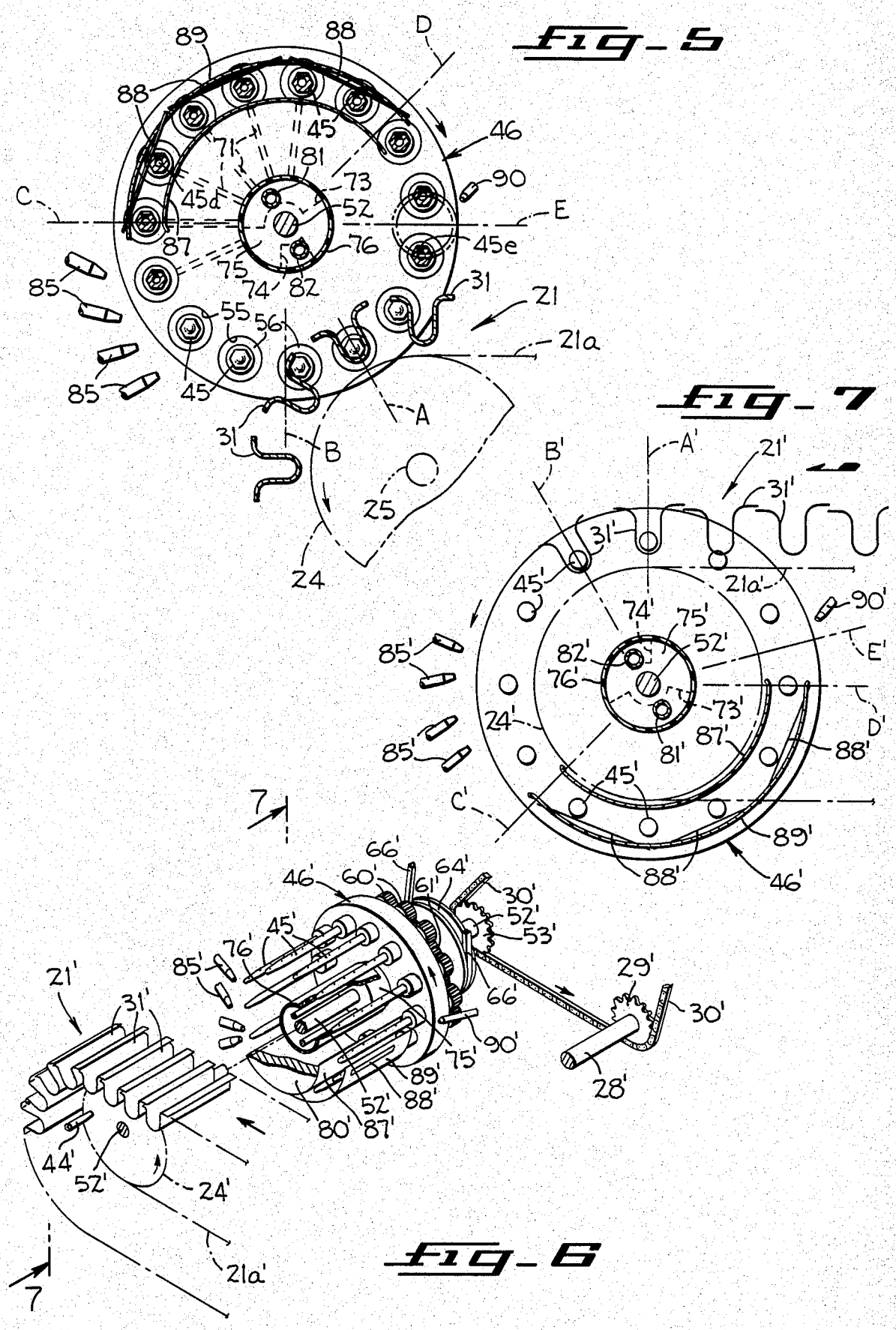

METHOD OF AND APPARATUS FOR PROCESSING SQUID

BACKGROUND OF THE INVENTION

Although squid has excellent food value, it has not been extensively marketed in some areas due to the fact that the procedure for cleaning a squid is not generally known by average consumers in the area. Also, most commercial fish suppliers must use a manual, relatively inefficient method of preparing the squid which involves removing the head, eyes, skin, viscera, ink sac, and backbone from the mantle of the squid. Some attempts have been made to mechanize the squid cleaning operation and one of them is disclosed in the patent to Singh U.S. Pat. No. 4,285,099. In that device, each squid is automatically fed to a platform and oriented on the platform under a pair of rotating cutters that are then moved across the squid to divide it into three parts, namely, the mantle, the eye, and the tentacles. Means is also provided for discharging the eye and the tentacles and positioning the mantle on a rapidly rotating peg to dislodge the inner organs of the squid and subjecting the exterior surface to a stream of water to remove skin and fins. The present invention involves a machine that handles squid in a similar manner but does so with mechanisms that operate entirely differently than the mechanisms of Singh. A patent to Berk U.S. Pat. No. 3,947,921 discloses a mechanism for pulling the head and the attached viscera from the mantle of a squid. A squid process machine is also disclosed in the patent to Olsson U.S. Pat. No. 4,329,761.

Other patents disclosing mechanisms that are similar in some respects are the patents to Youman U.S. Pat. No. 1,900,267; to Youman U.S. Pat. No. 1,853,328; to Schlichting U.S. Pat. No. 2,835,918 and to Hogan U.S. Pat. No. 3,670,363.

An object of the present invention is to provide an improved method and apparatus for processing a squid in a continuous operation that begins with the receiving of a whole squid and ends with the discharge of a cleaned and skinned mantle.

SUMMARY OF THE INVENTION

An individual squid is received in an elongate carrier of an endless chain conveyor in an oriented position so that, during further advancement of the conveyor, the squid is brought into engagement with two rotating cutters that divide the squid into three parts, namely, the mantle, the eye and the tentacles. After the eye and the tentacles have been discharged, the mantle is transferred onto a rotatable peg. As the peg rotates, jets of water strip the skin from the mantle and flush loosened internal parts from inside the mantle before the mantle is forced from the peg into a suitable receptacle.

DESCRIPTION OF THE DRAWINGS

FIG. 1 is a fragmentary diagrammatic perspective of the machine of one embodiment of the machine of the present invention.

FIG. 2 is a fragmentary, enlarged vertical section taken longitudinally of the machine along line 2—2 of FIG. 1.

FIG. 3 is an enlarged diagrammatic section taken along line 3—3 of FIG. 1. FIG. 4 is an enlarged diagrammatic section taken along line 4—4 of FIG. 1.

FIG. 5 is an enlarged diagrammatic section taken along line 5—5 of FIG. 1.

FIG. 6 is a fragmentary diagrammatic perspective of a second embodiment of the machine of the present invention, the view being similar to FIG. 1 but showing only the discharge end of the feed conveyor and the turret to which squid are transferred.

FIG. 7 is a diagrammatic section taken along line 7—7 of FIG. 6.

DESCRIPTION OF PREFERRED EMBODIMENTS

In FIG. 1 the reference numeral 20 indicates generally a portion of the squid processing machine of the present invention which includes a pair of parallel conveyors 21 and 22 having endless chains 21a and 22a respectively. Chain 21a is trained around an idler sprocket 23 and a drive sprocket 24 to which a shaft 25 is keyed. Chain 22a is trained around an idler sprocket 26 and a drive sprocket 27 that is keyed to a shaft 28. At one end, each of the shafts 25 and 28 is keyed to a sprocket 29 that is engaged by a chain 30 which is driven by a motor 30a by a belt and pulley 30b and sprocket 30c. Since the two sprockets 29 are of the same size, the shafts 25 and 28 will be rotated at the same speed in counterclockwise directions (FIG. 1). Also, the size of the sprockets 23, 24, 26 and 27 are so chosen that the upper runs of the chains 21a and 22a will be advanced from right to left (FIGS. 1 and 2) at the same speeds in the same horizontal plane. Accordingly, elongate generally U-shaped trough-like carriers 31 carried by the chains are advanced from right to left, with each carrier on chain 21a being aligned longitudinally with a carrier on chain 22a to form a long composite squid-receiving trough.

As seen in FIG. 3, each carrier 31 has a U-shaped bracket 32 brazed to its undersurface, and each depending leg of the bracket is secured to a link 33 of the associated chain 21a or 22a.

The drive shafts 25 and 28 are rotatably journalled in a conventional support frame 34 (FIG. 1) which supports a bar 35 that extends longitudinally of the conveyors between the carriers 31 in the upper runs of the conveyors. The support bar 35 extends from the feed end X to a point below two circular cutting blades 37 and 38 which are disposed generally parallel to the chains 21a and 22a at an elevation such that, as seen in FIG. 3, the lower peripheral portions of the blades are below and on opposite sides of the upper surface of the support bar 35. Both blades are driven by a shaft 39 that is rotated by a motor 40 through a belt drive 41.

As mentioned above, the present machine is particularly adapted to process squid and, as indicated in FIG. 3, a squid has three parts, a mantle M, a head H, and tentacles T. In the use of the machine, a squid is placed in each set of aligned carriers 31 at the feed end X with the mantle M (FIG. 3) in the carrier of conveyor 21, the tentacles T in the associated carrier of conveyor 22, and the head H generally on the flat, upper support surface of the bar 35, with a raised annular portion M1 of the mantle M overlying the edge of the carrier of conveyor 21 at a point to the left of the support bar. It will be noted that the support surface of the bar 35 is at an elevation slightly above the elevation of the support surfaces of the carriers so that a ledge is provided obstructing movement of a squid, longitudinally of the carriers. As each squid is carried toward the cutters 37 and 38, it passes a nozzle 39a which directs a stream of water at the end of the mantle M of the squid, causing the squid to move to the right (FIG. 3) until a portion of the ring M1 of the mantle engages the ledge provided by the bar 35. When the ring M1 engages the ledge, the movement of the squid is stopped, with the squid in proper position relative to the cutting planes of the blades 37 and 38. Accordingly, as the squid advances further toward the left (FIG. 1) it is severed into three sections by the blades. Since the support bar terminates at a point slightly on the downstream side of the axis of rotation of the blades as seen in FIG. 2, the severed head section H moves over the end of the support bar and, aided by a downwardly-directed jet of water from nozzle 39b, drops into a take-away chute 41 as the mantle M and tentacles T are carried along by the carriers 31. Nozzles 39c, that are downstream from nozzle 39b, direct water on the cutters 37 and 38 to keep them clean.

The conveyor 22 is not as long as conveyor 21 and therefore the tentacles T are discharged next into a take-away chute 42 (FIG. 2) disposed below the downstream end of conveyor 22 in a position to receive each tentacle as it is discharged.

After its associated tentacle has been discharged, each mantle M is carried to the end of conveyor 21 where it becomes aligned with one of a plurality of identical cleaning pegs 45 (FIG. 5) carried on another conveying means in the form of a turret 46. When the mantle is in alignment with the cleaning peg, a blast of water from a nozzle 44 (FIG. 1) is directed generally longitudinally of the carrier to move the mantle lengthwise of its carrier onto the peg. The turret includes a cylindrical plate 47 (FIG. 4) that has a central cylindrical opening 48 therethrough. A circular support plate 49 is welded to one face of the plate 47 with a central cylindrical opening 50 in plate 49 concentric with the axis of the cylindrical plate 47. A drive shaft 52, that is journalled near each end in the support frame, is pinned to the support plate 49 by a tapered pin 51 so that rotation of shaft 52 causes rotation of the two plates 49 and 47. As seen in FIG. 1, a sprocket 53, which is keyed to shaft 52, is rotated by the chain 30 that drives the sprockets 29 of the feed conveyors.

Near its periphery, the cylindrical plate 47 is provided with a plurality of cylindrical openings 55 that are equi-angularly spaced around the axis of the turret (FIG. 5), each opening receiving a tubular metal sleeve 56 (FIG. 4) pressed therein. A pair of spaced plastic sleeves 57, that are disposed in the bore of each sleeve, rotatably journal one of cleaning pegs 45, each of which has a small planet gear 60 secured to one end. Each planet gear 60 is in mesh with a sun gear 61 that is secured to a sleeve 62 that rotates around the axis of shaft 52 on a bushing 63. A pulley 64 is keyed to one end of the sleeve 62 and, as seen in FIG. 1, a belt 66 is trained around the pulley 64 and around a pulley 67 that is driven from a motor 68 through a second belt and pulley drive 69. The drive arrangement is such that the belt 66 drives the pulley 64 and the sun gear 61 in a clockwise direction. Since the planet gears 60 are also carried in a clockwise direction by the turret but at a slower rotary speed, the planet gears and the attached cleaning pegs 45 are rotated in a counterclockwise direction about their own axes.

Each cleaning peg 45 consists of a forward portion 45a (FIG. 4) that is threaded on the end of a shank 45b which is keyed to the planet gear 60. The forward portion has a rounded nose 45c, a central passage 45d, and a plurality of rearwardly slanted apertures 45e that are arranged to deliver flushing water from the passage 45d to the exterior of the peg. Each shank 45b has a central passage that communicates with the passage 45d and, by means of two radial passages 70, with an annular chamber 72 in the sleeve 56. A plurality of radial passages 71, some of which are shown in FIG. 5, are provided in the turret, each passage communicating with the annular chamber 70 in one of the sleeves 56. At its inner end, each radial passage alternately comes into flow communication with one of two peripheral chambers 73 or 74 (FIG. 3) in a stationary cylindrical valve block 75 that is disposed in the central opening 48 of the turret. The valve block is held in place by a tubular housing 76 (FIG. 4), which may be made of a general rigid plastic material, and is secured at one end to the valve block and, at the other end, to an upright support wall 80 that is rigidly supported from the frame of the machine. A copper pipe 81, which extends through the wall 80, is connected at one end to a source of water under pressure and, at the other end, extends into the valve block 75 where it communicates with the peripheral chamber 73. Similarly, a copper tube 82 establishes flow communication between a source of water and the peripheral chamber 74 in the valve block. The arrangement is such that water is continually supplied to the peripheral chambers 73 and 74. Accordingly, as the turret rotates, each radial passage 71 moves into alignment with chamber 73, causing water to move out along the radial passage, into the annular chamber 72 in the associated sleeve 56, and then into the cleaning peg 45 for discharge through the backwardly-inclined passages 45e. When the radial passage 71 moves out of registry with the chamber 73, the flow of water to the cleaning peg stops but it begins again when the radial passage moves into registry with the chamber 74. Seal rings are disposed between the turret and each sleeve 56 on each side of the chamber 70 of the sleeve, and between the rotating turret and the valve block 75 to prevent escape of water as it flows toward the cleaning peg.

Referring to FIG. 5, each cleaning peg comes into longitudinal alignment with the mantle of a squid at angular position A. At this time the radial passage 71 that brings water to that particular cleaning peg is in registry with the chamber 74. It will be evident from FIG. 4 that, as a mantle is urged onto the unsupported end of a cleaning peg by nozzle 44, the rearwardly inclined streams of water ejected through the slanted openings 45e aid in urging the mantle into impaled position on the rotating peg.

As the rotation of the turret continues, the water to the inside of the peg is stopped at angular position B and the squid mantle comes into range of jets of water ejected from a plurality of nozzles 85 that are mounted on a suitable support adjacent the turret. The nozzles are spaced angularly around the axis of the turret so that their jets successively engage the rapidly rotating squid in overlapping areas. Also the nozzles 85 are in different vertical planes spaced longitudinally of the axis of the turret. As a result, all surfaces of the squid are engaged, and the fins and skin are stripped from the squid.

At angular position C, the cleaning peg carries the squid into a passage defined by an inner, partially cylindrical wall 87 and a series of pressure plates 88 secured to an outer partially cylindrical wall 89. As seen in FIG. 4, the inner wall 87 is supported from the upright wall 80 and the outer wall 89 is supported from the inner wall. The pressure plates are made of a resilient material, such as thin leaf spring plate material, and are so positioned that the squid mantle is gripped between each plate and the inner wall 87. As a result, the rotation of the mantle with the rotating peg is retarded, and the peg rotates relative to the inside of the mantle to help loosen the internal members of the squid such as the viscera and the backbone. Also at angular position C, the radial passage 71 moves into registry with chamber 73 so that water is again ejected outwardly through the angled passages 45e of the peg to flush the loosened internal members out of the cavity of the mantle. At about angular position D, the mantle moves out of engagement with the last hold-down plate and the radial passage 71 moves out of registry with the chamber 73 shortly thereafter. At angular position E, the mantle of the squid is pushed axially from the peg by a blast of water from a nozzle 90 (FIG. 1) that is supported on the drive side of the turret adjacent angular position E. The nozzle 90 is oriented at a slight angle relative to the axis of the turret so that the blast of water leaving the nozzle has a component of force extending longitudinally of a cleaning peg at position E. Accordingly, the jet of water from the nozzle effectively engages the mantle on the peg and forces it from the peg into a suitable receptacle.

It will be evident that the water supply system can be arranged to direct water continuously from the squid positioning nozzle 44, the skinning nozzles 85 and the squid-ejecting nozzle 90. Alternately, the system could include a series of valves that are opened and closed by cams in timed relation with the angular movement of the turret so that water is directed out of the nozzles 44, 85 and 90, or any one of them, only when desired.

In FIGS. 6 and 7 an embodiment of the squid processing machine of the present invention is shown in which the turret and the conveyor that carries the squid mantles are driven from a common shaft to facilitate transfer of each mantle from a bucket of the conveyor to a cleaning peg of the turret. Many of the parts of the embodiment of FIGS. 6 and 7 are identical to parts of the machine of FIGS. 1-5 and these parts will be given the same reference numerals as in FIGS. 1-5, followed by a prime suffix.

The mantle conveyor 21' of FIG. 6 is mounted alongside and parallel to a companion conveyor (not shown) that is identical to conveyor 22 of FIG. 1. Accordingly, whole squid that are positioned one by one on the two conveyors, straddle the space between the conveyors so that synchronized movement of the conveyors moves the squid past a positioning water jet, and then under a pair of circular rotary cutters that sever the central part of the squid from the mantle which remains on the conveyor 21' and from the tentacles which remain in the other conveyor. The central portion of the squid and the tentacles are discharged into separate receptacles as in the apparatus of FIGS. 1-5, while each mantle is conveyed along in a separate carrier 31' of conveyor 21' to a transfer station, that is indicated in FIG. 7 as angular position A', where the carrier comes into longitudinal alignment with one of the cleaning pegs 45' on the turret 46'. As in the arrangement of FIG. 4, the shaft 52' that is keyed to the turret 46', is journalled for rotation in the side walls of the frame of the machine and passes through a support wall 80' of the frame that is intermediate the side walls. A drive sprocket 53' is keyed to one end of the shaft 52' and the sprocket 24' at the discharge end of conveyor 21' is keyed to the other end of the shaft 52'. Accordingly, as the chain 30' drives the shaft 52' in a counterclockwise direction (FIG. 6), the turret and the conveyor 21' are actuated simultaneously. Also, the chain 30' drives in a counterclockwise direction a sprocket 29', that is keyed to the drive sprocket of the shorter conveyor. Further, the sun gear 61' is rotated in a clockwise direction by the pulley 64' with the result that the planet gears 60' are rotated about their axes Referring to FIG. 7 it will be noted that the cleaning pegs 45' on the turret 46' and base of each U-shaped carrier 31' are located at the same radial distance from the axis of the shaft 52', and that the pegs are angularly spaced around the turret to conform with the angular spacing of the carriers. The arrangement is such that each carrier becomes aligned longitudinally with one of the cleaning pegs at angular postion A' where a blast of water from one or more nozzles 44' drive a squid mantle from the carrier onto the cleaning peg.

The valve block 75' is identical to valve block 75 in that it is supported from the support wall 80' by a rigid plastic sleeve and has two angular peripheral chambers 73' and 74' which are continuously supplied with water under pressure by copper tubes 81' and 82' respectively. The valve block 75' differs from block 75 in that it is oriented so that chamber 74' is above chamber 73' as seen in FIG. 7. Chamber 74' extends counterclockwise from about three degrees before top dead center (angular position A') to about 35° past angular position A', while chamber 73' extends counterclockwise from a position about 115° past top center to a position about 260° past top center.

As in the embodiment of FIGS. 1-5, rotation of the turret brings radial passages in the turret consecutively into alignment with the angular chambers 73' and 74', and relative rotation between the turret and the planet gear carrier, which is driven by the belt 66' through pulley 64', causes rotation of the cleaning pegs 45' about their own axes as they move around the axis of shaft 52'.

In operation, just before the turret moves a peg 45' into registry with a carrier 31' at position A' (FIG. 7), the radial passage in the turret that is associated with that peg establishes flow communication with chamber 74'. Accordingly, when a mantle is transferred onto the peg, the jets of water issued from the rearwardly inclined passages in the peg help to move the mantle onto the peg. As the turret continues to rotate, the water delivered to the peg is stopped at angular position B'. Shortly thereafter the mantle on the rotating peg is brought into the range of the jets of water issuing from the nozzles 85' with the result that the fins and skin are removed from the mantle. At angular position C', water is again directed into the cleaning peg as the mantle on the peg moves into engagement with the stationary wall 87' and one of the resilient pressure plates 88'. As the mantle is moved along the arcuate space between the wall 87' and the pressure plates 88', the peg rotates relative to the body of the mantle to loosen the viscera and backbone of the squid, and water issuing from the pegs flushes the loosened parts out of the mantle body. At angular position D', the mantle moves out of engagement with the last pressure plate 88', and the water to the peg is stopped. Shortly thereafter, at position E', the mantle is driven longitudinally off the peg by water jets issuing from one or more nozzles 90', and deposited in a suitable receptacle.

Referring to FIG. 6, it will be noted that the drive mechanisms, including belt 66' and chain 30', of FIG. 6, are oriented in a little different manner than the corresponding parts of FIG. 1. This re-arrangement is due to the use of a common drive shaft for the sprocket 24' and the turret 46'. It will of course be understood that the motors and drive connections for the sun gear 61', shaft 52', shaft 28', and the shaft of the rotary cutters are generally similar to the motors and drive connections of FIG. 1, and are so chosen as to obtain the movement of the various parts in the desired direction and at the desired speeds.

From the foregoing descriptions it will be apparent that the machine of the present invention provides a method for effectively receiving a whole squid and automatically performing all the cutting, skinning, and cleaning oeprations necessary to produce a marketable piece of squid. The unique arrangement whereby, in sequential steps and during continuous movement of the squid, the squid is cut into three sections, two of the sections discharged and the third section transferred to a rotating peg, and the skin is removed from the remaining section and its inner organs are separated from the section, makes the machine particularly effective from a time standpoint while still producing an adequately prepared section of squid.

We claim:

1. A machine for processing squid comprising
   first conveyor means for moving squid along a predetermined path and having a plurality of carriers individually adapted to receive a squid,
   second conveyor means having carriers movable adjacent the carriers of said first conveyor means,
   means for driving said first and second conveyor means at speeds such that a carrier on one of said conveyor means will be moved into registry with a carrier on the other conveyor means,
   and means for transferring a squid in a carrier of said first conveyor means to a carrier of said second conveyor means while the carriers are in registry,
   said first conveyor means comprising a pair of endless conveying members, each conveying member having a plurality of elongate transversely oriented carriers, said driving means being arranged to move the upper runs of said endless conveying members along adjacent parallel paths with an elongate carrier on one conveying member in longitudinal alignment with an elongate carrier on the other conveying member,
   the upper runs of said conveying members being spaced a short distance laterally from each other, said first conveyor means further comprising a bar disposed between said upper runs for supporting an intermediate section of an elongate squid disposed in a pair of aligned carriers straddling the space between said upper runs.

2. A machine for processing squid comprising:
   first conveyor means for moving squid along a predetermined path and having a plurality of carriers individually adapted to receive a squid,
   second conveyor means having carriers movable adjacent the carriers of said first conveyor means,
   means for driving said first and second conveyor means at speeds such that a carrier on one of said conveyor means will be moved into registry with a carrier on the other conveyor means,
   and means for transferring a squid in a carrier of said first conveyor means to a carrier of said second conveyor means while the carriers are in registry,
   said first conveyor means comprising a pair of endless conveying members, each conveying member having a plurality of elongate transversely oriented carriers, said driving means being arranged to move the upper runs of said endless conveying members along adjacent parallel paths with an elongate carrier on one conveying member in longitudinal alignment with an elongate carrier on the other conveying member,
   the upper runs of said conveying members being spaced a short distance laterally from each other, said first conveyor means further comprising a bar disposed between said upper runs for supporting an intermediate section of an elongate squid disposed in a pair of aligned carriers straddling the space between said upper runs,
   the upper surface of said support bar being at an elevation slightly above the elevation of the support surfaces of said aligned carriers to provide a raised ledge obstructing movement of a squid laterally across said support bar, and
   means for urging said squid longitudinally of said carriers until a protrusion on the squid engages said ledge.

3. A machine for processing squid comprising
   first conveyor means for moving squid along a predetermined path and having a plurality of carriers individually adapted to receive a squid,
   second conveyor means having carriers movable adjacent the carriers of said first conveyor means,
   means for driving said first and second conveyor means at speeds such that a carrier on one of said conveyor means will be moved into registry with a carrier on the other conveyor means,
   and means for transferring a squid in a carrier of said first conveyor means to a carrier of said second conveyor means while the carriers are in registry,
   said first conveyor means comprising a pair of endless conveying members, each conveying member having a plurality of elongate transversely oriented carriers, said driving means being arranged to move the upper runs of said endless conveying members along adjacent parallel paths with an elongate carrier on one conveying member in longitudinal alignment with an elongate carrier on the other conveying member,
   the upper runs of said conveying members being spaced a short distance laterally from each other whereby a squid disposed in aligned carriers will straddle the space between the carriers,
   said machine further comprising
   a pair of cutters having portions disposed in laterally spaced relation in the space between said upper runs,
   whereby a squid conveyed along by aligned carriers will be carried into engagement with said cutters and be divided into three segments.

4. The machine of claim 3 further comprising a support bar disposed in the space between said upper runs to support the intermediate section of a squid disposed in said carriers, said bar terminating adjacent the downstream side of said cutters whereby the section cut from the squid by said cutters will be dropped from said bar after passing said cutters.

5. A machine for processing squid comprising
   first conveyor means for moving squid along a predetermined path and having a plurality of carriers individually adapted to receive a squid,
   second conveyor means having carriers movable adjacent the carriers of said first conveyor means, means for driving said first and second conveyor means at speeds such that a carrier on one of said conveyor means will be moved into registry with a carrier on the other conveyor means, and means for transferring a squid in a carrier of said first conveyor means to a carrier of second conveyor means while the carriers are in registry, said first conveyor means being an endless chain of carriers and said second conveyor means being a turret adapted to move its carriers in a circular path, the carriers of said turret being elongate pegs having central passages, and said turret having radial passages leading to said central passages, said machine further including a valve disposed in fixed position adjacent said turret, chamber means in said valve, means for continuously supplying water to said chamber means, and means for establishing flow communication between each radial passage in said turret and said chamber means at predetermined intervals during rotation of said turret.

6. A method of processing squid comprising the steps of:

conveying an elongate squid along a first path in a carrier, dividing the squid into sections during movement along said path, moving a plurality of impaling pegs along an endless path adjacent said first path, transferring a section of the squid from the carrier to one of said pegs for impaling thereon during continuous movement of the carrier along said first path, removing skin and the like from the squid section as said one peg moves a predetermined distance along said endless path, loosening internal organs from the squid section and flushing the organs from the squid as said one peg moves a second predetermined distance along said endless path, and ejecting the squid section from said one peg.

* * * * *